United States Patent
Chapman et al.

[11] Patent Number: 6,128,313
[45] Date of Patent: Oct. 3, 2000

[54] APPARATUS AND METHOD FOR FILTERING LINE NOISE AND IMPROPER PACKET FORMATTING

[75] Inventors: John T. Chapman, Cupertino; Jonathan G. Berman, Mountain View, both of Calif.

[73] Assignee: Cisco Technology, Inc., San Jose, Calif.

[21] Appl. No.: 08/948,709

[22] Filed: Oct. 10, 1997

Related U.S. Application Data

[60] Provisional application No. 60/058,640, Sep. 11, 1997.

[51] Int. Cl.[7] .................................. H04J 3/16; H04J 3/22
[52] U.S. Cl. ............................................. 370/465; 370/242
[58] Field of Search .................... 370/465, 471, 370/488, 514, 516, 517, 519, 242, 276, 280, 294, 389; 395/185.01, 185.02, 185.04, 185.05, 200.61, 200.66, 285, 379, 386, 387, 388, 598, 830, 831, 838, 800.32; 364/140, 572, 716.04, 724.011

[56] References Cited

U.S. PATENT DOCUMENTS

| | | | |
|---|---|---|---|
| 4,368,512 | 1/1983 | Kyu et al. ................................ | 395/287 |
| 4,646,287 | 2/1987 | Larson et al. . | |
| 4,748,656 | 5/1988 | Gibbs et al. ............................. | 395/309 |
| 4,864,303 | 9/1989 | Ofek ............................................ | 341/95 |
| 5,020,058 | 5/1991 | Holden et al. . | |
| 5,123,014 | 6/1992 | Federkins et al. ....................... | 370/512 |
| 5,191,582 | 3/1993 | Upp ........................................ | 370/392 |
| 5,642,437 | 6/1997 | Laczko, Sr. et al. .................... | 382/246 |
| 5,684,804 | 11/1997 | Baronetti et al. ........................ | 370/509 |
| 5,717,394 | 2/1998 | Schwartz et al. .......................... | 341/51 |
| 5,719,862 | 2/1998 | Lee et al. ................................. | 370/389 |
| 5,822,615 | 10/1998 | Yamashita et al. ...................... | 395/830 |

*Primary Examiner*—Dang Ton
*Assistant Examiner*—Phirin Sam
*Attorney, Agent, or Firm*—Marger Johnson & McCollom, P.C.

[57] ABSTRACT

Exceptions to valid protocol categories are filtered from a bit stream. Bit sequences between flags are processed to detect bit sequences that do not qualify as valid packet data but do qualify as exceptions to other nonpacket protocol categories. The exceptions or nonconforming bits are filtered from the bit stream before being further processed. Because the nonconforming bits are filtered from the bit stream, extraneous packet errors are prevented from being generated by the packet decoder. The bit stream is generated in a packet protocol, such as HDLC. The flags and bits sequences are detected according to bit patterns used in the transmitted packet protocol.

19 Claims, 10 Drawing Sheets

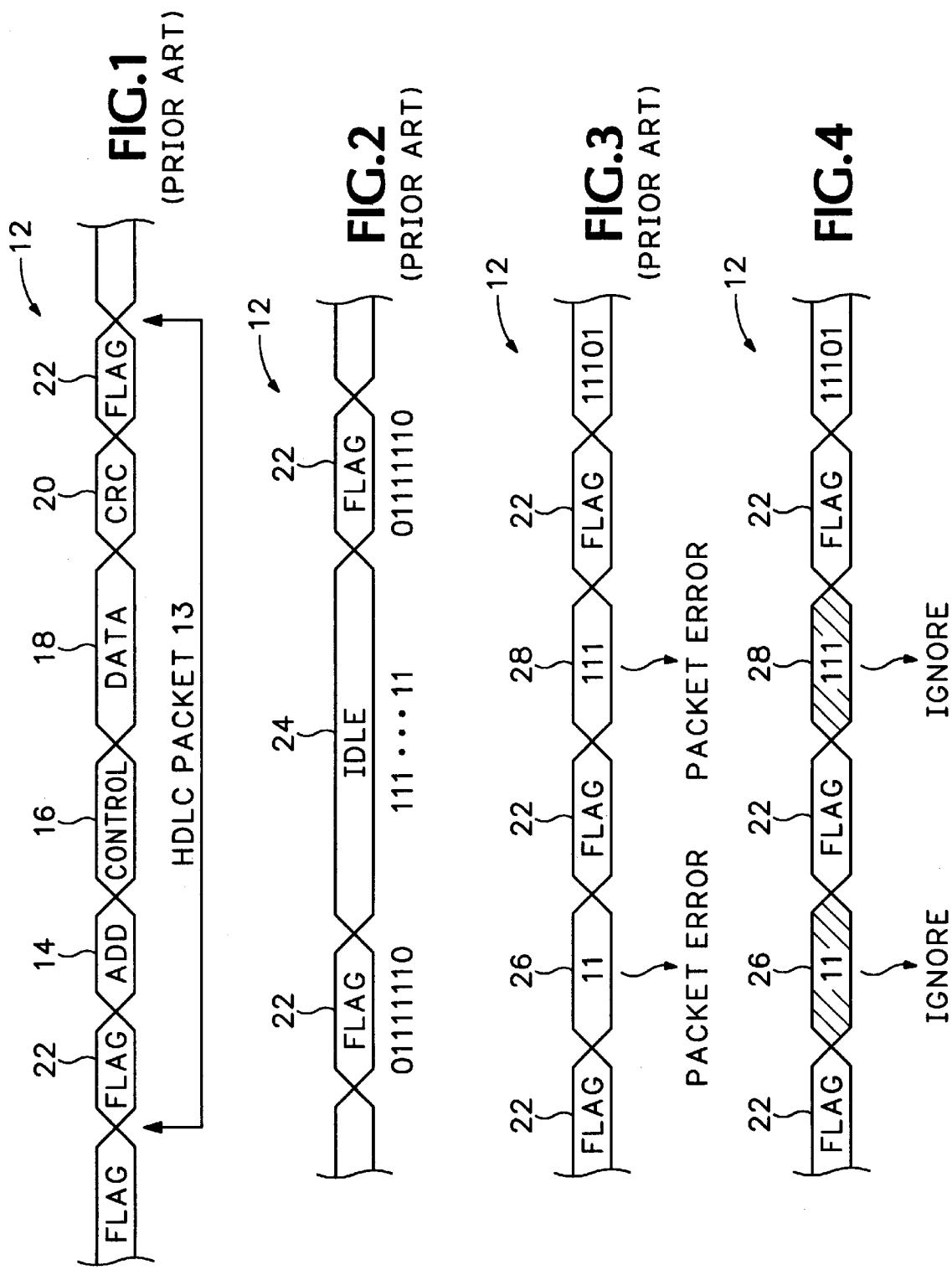

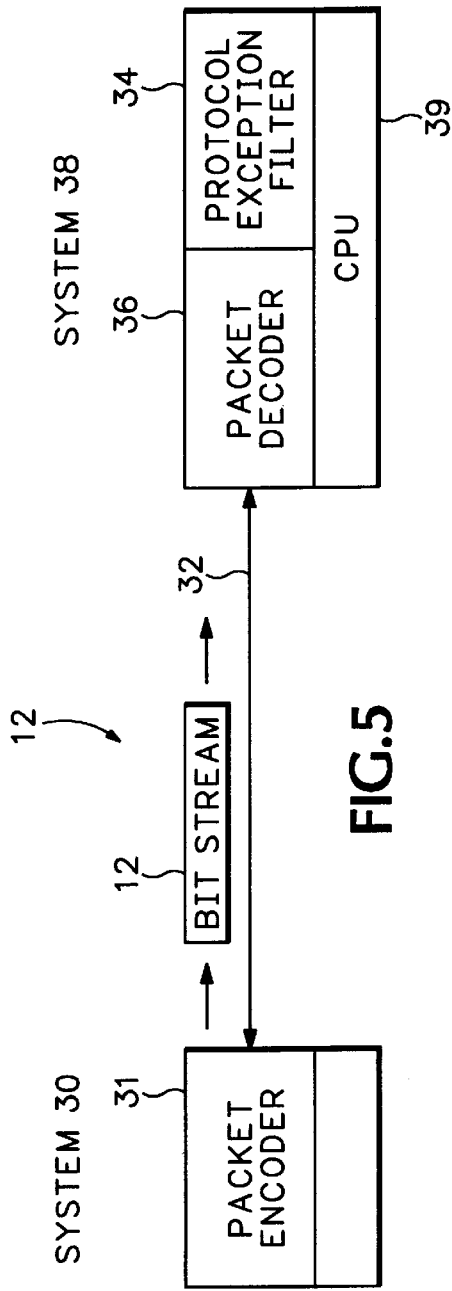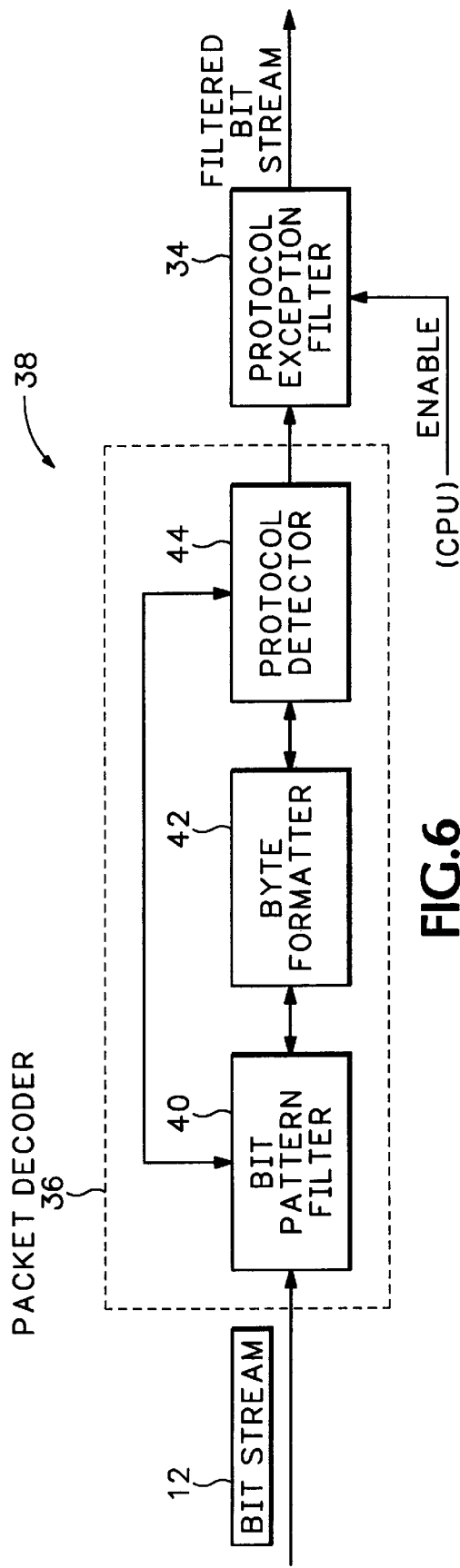

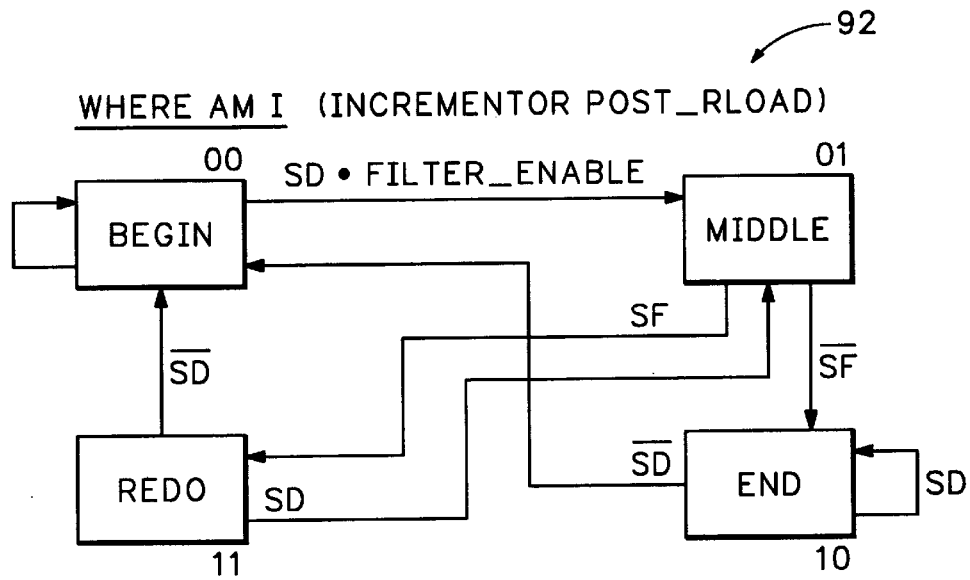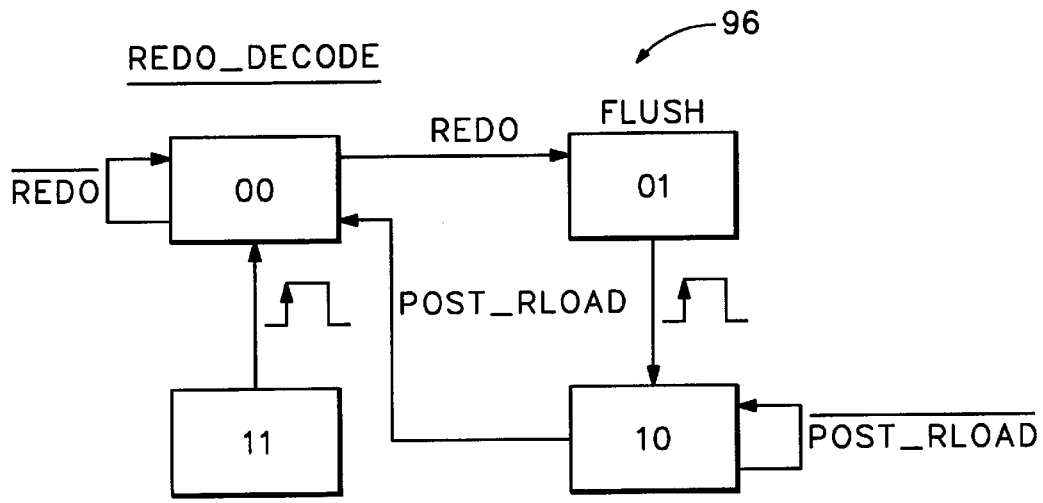
FIG.12

APPARATUS AND METHOD FOR FILTERING LINE NOISE AND IMPROPER PACKET FORMATTING

This application claims the benefit of U.S. Provisional application Ser. No. 60/058,640 filed Sep. 11, 1997.

BACKGROUND OF THE INVENTION

This invention relates to filtering protocol noise from digitally transmitted data and more particularly to detecting and removing bits sequences in a bit stream that are exceptions to a transmitted packet protocol.

Network packet protocols, such as a High Level Data Link Control (HDLC) protocol, transmit information in a structured packet format. The packet protocol typically includes address bits, control bits, data bits and cyclic redundancy checksum (CRC) bits. In order for circuits to synchronize with the bit stream, flags are located at the beginning of each packet. The flags have a unique bit pattern that distinguish the flags from packet data. When there is no data or flags idle bits are inserted into the bit stream. Idle bits are simply a consecutive stream of bits all having the same logic one bit value.

The flags are maintained as unique bytes in the bit stream by bit stuffing zeros into the bit stream after a predetermined number of consecutive one's. The receiver of the transmitted HDLC bit stream will then strip out a zero if it occurs after the same predetermined number of consecutive one's. Thus, flags are assured of having a unique bit pattern in the transmitted bit stream.

A system receiving the bit stream synchronizes on the transmitted packets by first detecting the flag. If the bit pattern following the flag does not coincide with a flag or an idle condition, the bits are considered packet data. If the bits are identified as a flag or idle, the system decoding the bit stream goes into an abort condition. The abort condition directs the packet decoder to ignore the flag or idle bits, since those bits do not comprise packet data.

A bit stream can include sequences of bits that do not conform with the packet format described above. For example, a relatively small number of bits might exist between two flags in the bits stream. This sequence of bits does not qualify as a flag or idle condition. Because the bits are not a flag or idle condition, the packet protocol considers the bits to be packet data. Because they are tagged as packet data, the bits are passed through a packet decoder circuit. The packet decoder circuit determines that the number of bits are too few to comprise valid packet data and, in turn, generates a packet error. Numerous packet errors are generated by bit sequences that function as exceptions to standard protocol abort schemes. These errors can overshadow critical packet errors and unnecessarily waste system resources processing and reporting the nonconforming bits as invalid packet data.

Accordingly, a need remains for selectively filtering bits that do not conform with the bit stream packet protocol.

SUMMARY OF THE INVENTION

Bits that do not conform with the packet protocol are filtered from a bit stream. Flags are detected in the bit stream indicating the beginning and end of a packet. Bit patterns are detected between the flags that constitute exceptions to valid packet abort protocols. The nonconforming bits have certain bit sequences that do not qualify as flag or idle bits in the packet protocol. On the other hand, the nonconforming bits are not valid packet data. The nonconforming bits are filtered before the bit stream is further processed. Thus, the circuitry receiving the filtered bit stream does not attempt to decode nonconforming bits as packet data and does not generate packet errors.

The bit stream is generated in an industry standard packet protocol, such as HDLC. Flags are detected according to a predetermined bit pattern used in the packet protocol. A portion of the bit stream is buffered after a detected flag. If the buffered bit sequence is not a flag or idle, but the number of bits between the two flags is too few to comprise a valid data packet, the buffered bits are considered nonconforming exceptions to the packet protocol and flushed from the bit stream.

In some situations, it may be desireable to identify and report the occurrence of the nonconforming bit sequences. A protocol exception filter is selectively enabled and disabled. When disabled, the bit stream is passed unfiltered directly to the packet decoder allowing the nonconforming bit sequences to generate packet errors. In the enable condition, the nonconforming bits are flushed before the packet decoder starts processing the bit stream.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a prior art diagram of a bit stream including a HDLC formatted packet.

FIG. 2 is a prior art diagram showing bit patterns for a flag and idle condition between HDLC packets.

FIG. 3 is prior art diagram showing protocol exceptions occurring between flags in the bit stream.

FIG. 4 is a diagram of the bit stream in FIG. 3 with the protocol exceptions filtered according to the invention.

FIG. 5 is a block diagram showing a system for filtering protocol exceptions according to the invention.

FIG. 6 is a detailed diagram of a packet decoder for the system shown in FIG. 6.

FIGS. 10–12 shows state diagrams for the protocol exception filter shown in FIG. 7.

DETAILED DESCRIPTION

Figure 7:
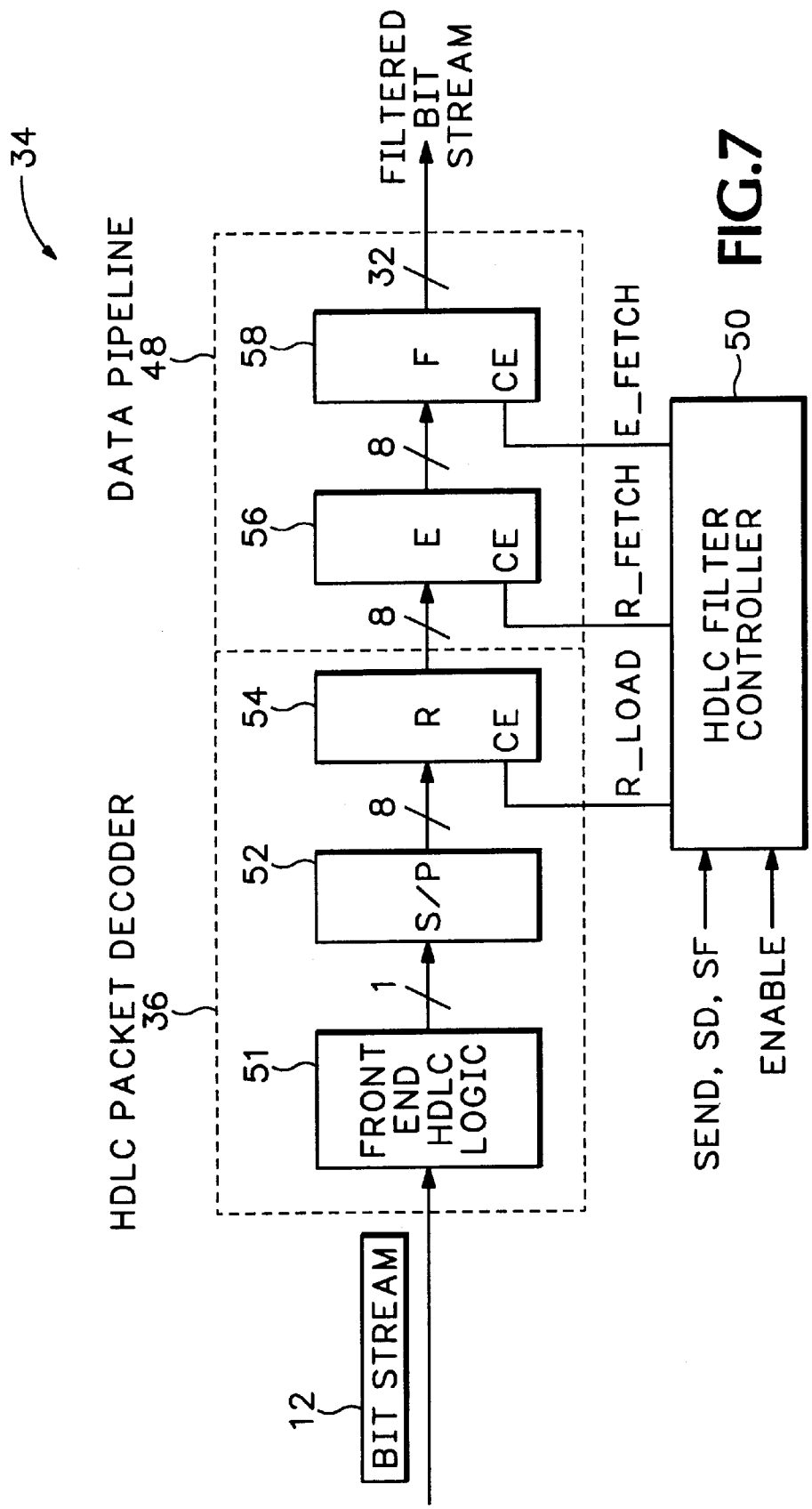
FIG. 7 is a detailed diagram of a protocol exception filter shown in FIG. 6.

Referring to FIG. 1, network data protocols, such as a High Level Data Link Control (HDLC) protocol, transmit a bit stream 12 in a packet format 13. The packet 13 includes address bits 14, control bits 16, data bits 18 and cyclic redundancy checking (CRC) bits 20. In order for a system receiving the bit stream 12 to synchronize with the transmitted packets 13, a flag 22 is inserted before each packet 13. The flag 22 has a unique bit pattern that distinguishes the flag 22 from the remainder of the packet 13.

Referring to FIG. 2, when packet data is not being transmitted, idle bits 24 or additional flags are inserted after flag 22. In the HDLC protocol, the bit pattern for the flag 22 is "01111110" and the bit pattern for the idle condition 24 is a sequence of sixteen or more consecutive ones "111 . . . 11". The flags 22 are maintained as unique bytes by stuffing zeros into the data stream of packets after six consecutive one's "111111". The receiver end of the transmitted HDLC bit stream strips out a zero that occurs after six consecutive one's. The packet 13, flags 22 and idle condition 24 are all defined as valid protocol categories.

A system receiving the bit stream 12 synchronizes on the flags 22 in order to determine the beginning of each HDLC packet 13. A string of seven or more one's occurring during the data portion of the bit stream (i.e., between two adjacent flags) creates an abort condition. In the abort condition, a packet decoder in the receiver ignores the bits in the bit stream until the next flag 22. Seven to fifteen consecutive ones is considered an invalid packet sequence and more than fifteen consecutive ones is considered an idle condition.

Referring to FIG. 3, the bit stream 12 can contain bits sequences that do not conform with the packet protocol used for detecting abort conditions. For example, a number of consecutive one's 26 or 28 may exist between adjacent flags in the bit stream 12. The HDLC protocol determines that the bits 26 and 28 reside between flags 22. Since, the number of consecutive one's is less than the number of consecutive ones necessary for a flag or idle condition, the HDLC decoder initially considers the bits 26 and 28 to be packet data. Since there are too few bits, the HDLC decoder determines during a packet decoding stage that the bits 26 and 28 are not valid packets. In turn, the HDLC decoder generates packet errors for each bit segment 26 and 28. Bit segments 26 and 28 are defined as exceptions to the valid protocol categories 13, 22, and 24 (FIGS. 1 and 2).

FIG. 4 is the same bit stream 12 shown in FIG. 3. A protocol exception filter is used to remove the nonconforming bit sequences 26 and 28 before the bit stream 12 is decoded by the packet decoder. Thus, the nonconforming bits 26 and 28 do not generate packet errors in the packet decoder.

FIG. 5 is a block diagram of a system for transmitting and receiving the bit stream 12. System 30 and system 38 represent any computer system capable of transmitting or receiving the digital bit stream 12. In one embodiment, systems 30 and 38 comprise network routers that format a bit stream into HDLC packets and route the packets to a specified address contained in the packet. The systems 30 and 38 are also capable of receiving other packet protocols from other systems and decoding the packets, according to the transmitted packet protocol. Routers and other general purpose network servers that transmit and receive HDLC packets and other packet protocols, are well known in the art and are, therefore, not described in detail. The invention is applicable to any system that receives bit sequences that qualify as exceptions to the transmitted packet protocol.

System 30 includes a packet encoder 31 that formats a raw bit stream into packets. System 38 includes a standard packet decoder 36 for decoding the bit stream 12 transmitted from system 30. A protocol exception filter 34 according to the invention is included with the packet protocol decoder 36. The protocol exception filter 34 removes bits from the bit stream 12 that are exceptions to the transmitted packet protocol. The packet decoder 36 and protocol exception filter 34 are controlled by a central processing unit (CPU) 39 in system 38.

FIG. 6 is a detailed block diagram of the packet exception filter 34 and packet decoder 36 shown in FIG. 5. The bit stream 12 is initially received by the packet decoder 36. The packet protocol decoder 36 includes a bit pattern filter 40 that detects and filters bit patterns according to industry standard packet protocols. The bit pattern filter 40 synchronizes the packet decoder 36 with flags 22 (FIG. 2). Upon detecting the flag 22, the bit pattern filter 40 enables the byte formatter 42 to begin converting the bit stream 12 into a byte stream. A protocol detector 44 detects flags, abort conditions and data in the byte stream. The packet decoder 36 is known to those skilled in the art and is, therefore, not described in further detail.

The protocol exception filter 34 removes the nonconforming bit sequences from bit stream 12. An enable line from the CPU 39 (FIG. 5) selectively enables and disables the protocol exception filter 34. Since the bits are removed by protocol exception filter 34, the system 38 does not generate packet errors from nonconforming bit sequences 26 and 28 (FIG. 2).

FIG. 7 is a detailed block diagram of the protocol exception filter 34 used for HDLC packets that includes a data pipeline 48 and an HDLC filter controller 50. The serial bit stream 12 passes through front end HDLC decode logic 51 and into a serial to parallel (SP) converter 52 in the HDLC packet decoder 36. The SP converter 52 converts the bit stream into eight bit data that is fed into an R holding register 54. The data pipeline comprises an E register 56 coupled to the output of R register 54 and F register 56 coupled to an output of E register 56. The output of F register 58 comprises the filtered bit stream shown in FIG. 4. The registers 54–58 are all enabled by the filter controller 50 that receives the enable signal from the CPU 39 (FIG. 5) and receives a send signal, send data (SD) signal and a send flag (SF) signal from the packet decoder 36.

Figure 8:
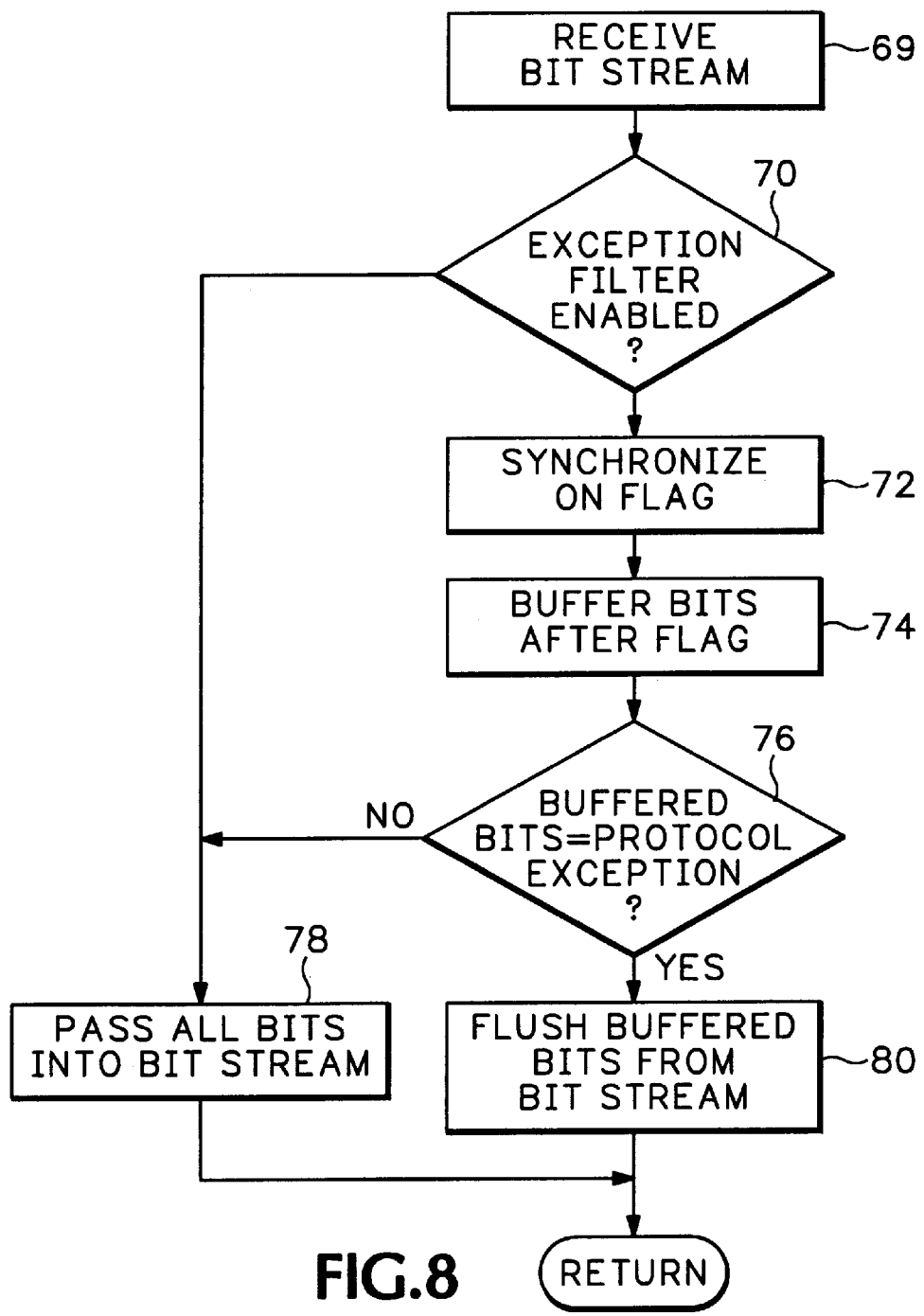
FIG. 8 is a step diagram showing how protocol exceptions are filtered according to the invention.

FIG. 8 is a step diagram showing the operation of the protocol exception filter 34 in FIG. 7. The bit stream 12 transmitted from system 30 (FIG. 5) is received by the protocol exception filter 34 in step 69. Decision step 70 checks if the exception filter is enable by the CPU 39 (enable). If not enabled, the exception filter 34 passes the bit stream unfiltered through the data pipeline 48 in step 78. If enabled, the exception filter 34 synchronizes on a flag in step 72. Step 74 buffers the first seven bits after the flag. Decision step 76 determines whether the buffered bits comprise an exception to the packet protocol. In one example for HDLC packets, if there are seven or fewer bits between adjacent flags and the seven or fewer bits are all ones, the bits are flushed from the bit stream in step 80. If the bits between flags do not comprise a protocol exception, the buffered bits are passed along with the rest of the bit stream through the packet decoder 36 in step 78.

Figure 9:
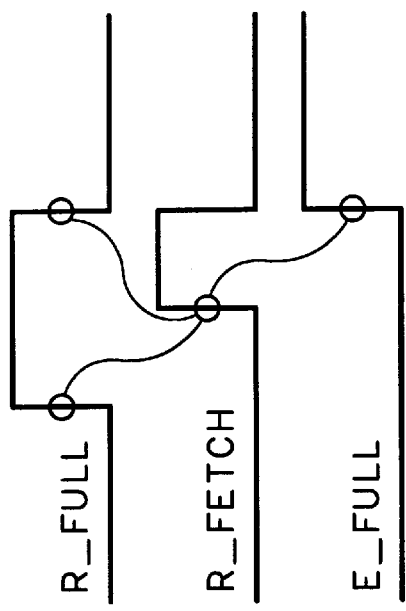
FIG. 9 is a timing diagram for handshaking signals in the protocol exception filter shown in FIG. 7.

FIG. 9 shows a timing diagram for a typical handshake for transferring data between registers R and E. Signals R_FETCH, E_FULL, E_FETCH, R_FULL, and F_FULL are handshake signals used for passing the data between the registers R, E and F. At some time the R_FULL signal from register R goes high which causes the signal R_FETCH to go high for one clock cycle. The high state of R_FETCH causes the signal R_FULL to go low (empty) and causes the signal E_FULL to go high. This handshaking is repeated through all registers in the data pipeline 48.

Figure 10:
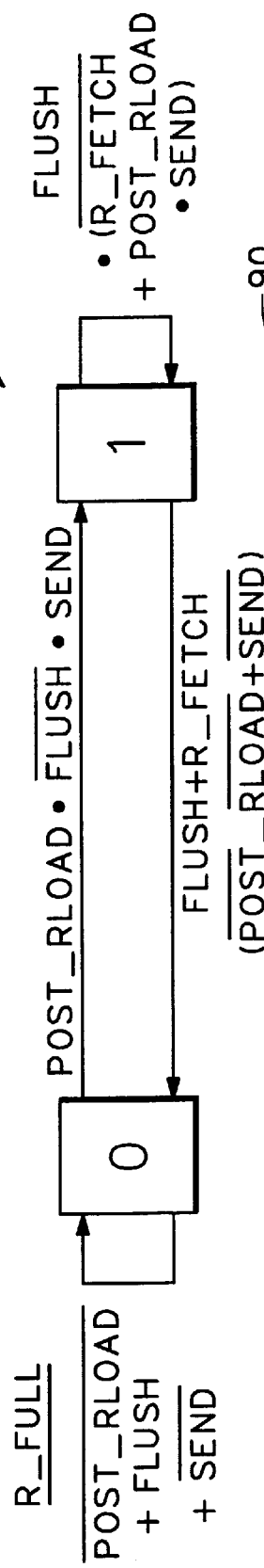
Figure 11:
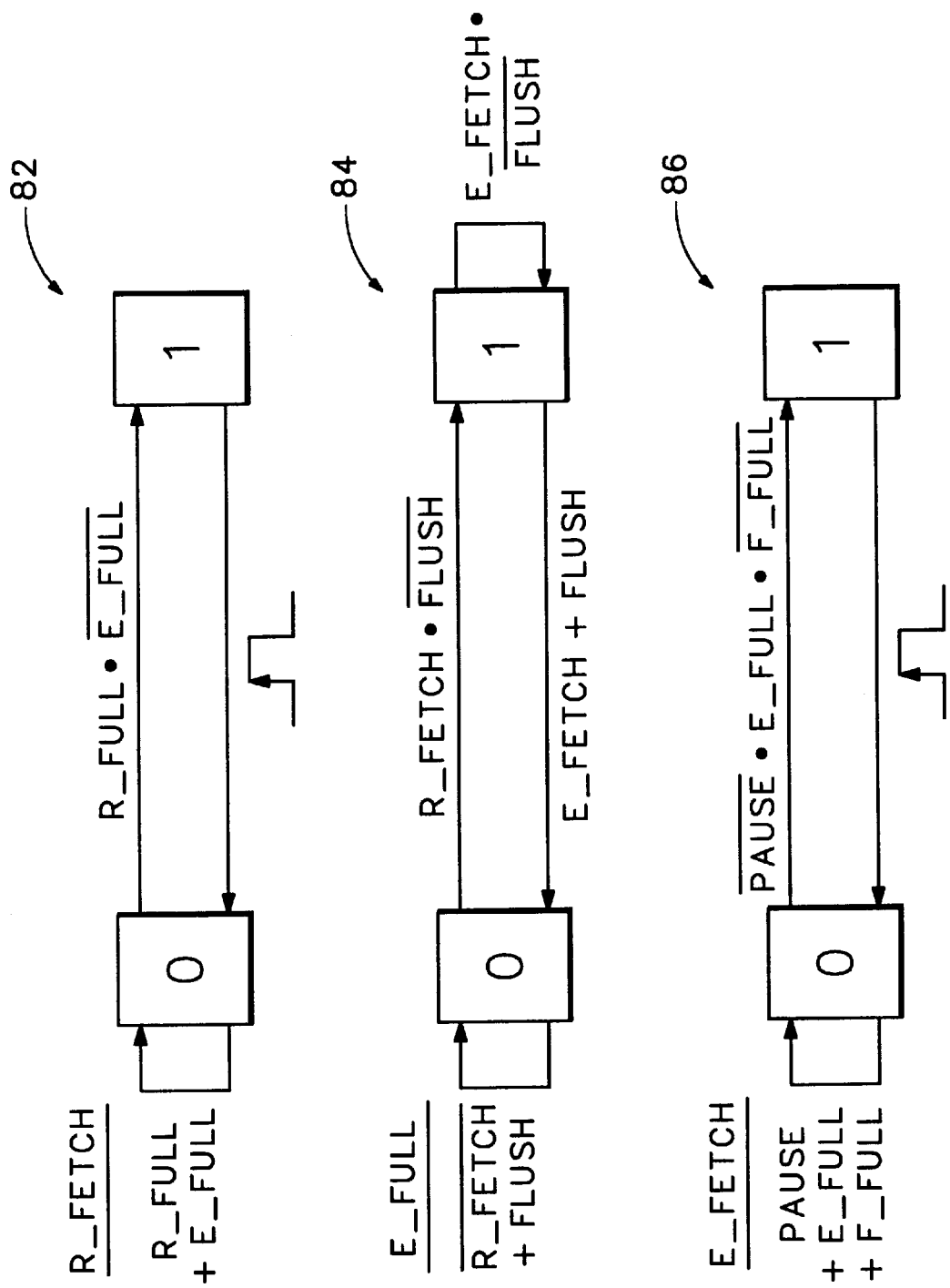

FIGS. 10–12 show detailed state diagrams for the different state machines used in filter controller 50 (FIG. 7.) The R register 54 is automatically enabled every 8 clock cycles to receive 8 bit bytes from SP converter 52. In order to fill the E register 56, data is fetched from the R register 54. An R_FETCH state machine 82 brings data into the E register 56. The F register 58 is driven by a E_FETCH state machine 86. A E_FULL state machine 84 declares when the E register 56 is full and a R_FULL state machine 88 declares when R register 54 is full.

The E_FETCH state machine 86 generates a signal E_FETCH that controls loading of the F register 58. The F register will only be loaded (E_FETCH asserted high) when the E register 56 is full (E_FULL asserted high), the F register is not full (F_FULL low) and the PAUSE signal is low. The PAUSE signal logic 94 stops data from flowing through the data pipeline 48.

Referring to E_FULL state machine 84 and R_FULL state machine 88, data is flushed by turning off the E_FULL or R_FULL signals. The E register 56 indicates full (E_FULL signal asserted high) when R_FETCH is asserted high and indicates empty (signal E_FULL low) when the E_FETCH signal is asserted high. If the FLUSH signal is asserted high, the E register 56 will never indicate full. When the E register 56 is full, the FLUSH signal will cause the E register 56 to indicate empty.

The R_FETCH state machine 82 determines when the E register 56 is loaded with data. When the R register 54 is full (R_FULL signal asserted high) and the E register 56 is empty (E_FULL signal low), the E register 56 is loaded from R register 54. Thus, when the FLUSH signal is asserted high, the existing data in the E register is written over by new data from R register 54 (flushed).

A POST_RLOAD signal from a POST_RLOAD state machine 90 occurs one clock after an R_LOAD signal generated by the packet decoder 36 and is used for timing control in the filter controller 50. The SEND signal comes from the packet decoder 36 (FIG. 6) and identifies data or status information in the bit stream 12.

The packet decoder 36 monitors the location of an HDLC packet coming from the bit stream 12. By eavesdropping on the packet decoder 36, the HDLC filter controller 50 decides whether to discard data as a protocol exception. A state machine WHERE_AM_I 92 starts off at the beginning of a HDLC packet in a state BEGIN. The send data (SD) signal indicates that a byte of data is being sent into the data pipeline 48 and causes the state machine 92 to move into a MIDDLE state.

The send flag signal SF indicates that the packet decoder 36 received a flag. The state machine 92 then goes into a REDO state. The REDO state determines when data is flushed from the data pipeline 48. If the SD signal is received while in the REDO state, the state machine 92 immediately goes back to the MIDDLE state in order to possibly filter the next packet. If the SD signal is low, the state machine 92 jumps back to the BEGIN state and waits again for data.

If the send flag (SF) signal is not asserted high, the state machine 92 moves to an END state. The END state indicates that bits past the flag appear to be valid data. The state machine 92 sits in the END state until the packet decoder 36 indicates it is no longer receiving data by deasserting the SD signal. The state machine 92 then moves back to the BEGIN state.

The WHERE_AM_I state machine 92 is incremented according to the POST_LOAD signal generated by the state machine 90 and only changes state once every 8 bit cycles. However, the FLUSH signal generated by the REDO_DECODE state machine 94 only needs to be one bit wide. Therefore, the REDO signal is converted from 8 bits down to one bit.

The state machine 96 stays in state 00 until the signal REDO is asserted high and then moves into state 01 where the FLUSH signal is asserted high. The state machine 96 stays in state 01 for only one clock period and then moves to state 10. The state machine 96 remains in state 10 until the POST_LOAD signal is asserted high indicating 8 bit cycles have passed and then returns to state 00.

A PAUSE signal pauses the flow of data in data pipeline 34 and is controlled by the state machine 92. The FLUSH signal flushes data in the data pipeline 48. The PAUSE signal freezes the data pipeline 48 and is equal to the MIDDLE or the REDO signal. When the state machine 92 moves from the BEGIN state, it not determined yet whether the packet will be flushed. The data pipeline 48 is paused by the PAUSE signal while determining whether to flush the data pipeline. The pipeline is flushed when the state machine 92 moves into the REDO state. The PAUSE signal is then asserted to give the data pipeline 48 time to flush the exception bits.

Figure 13:
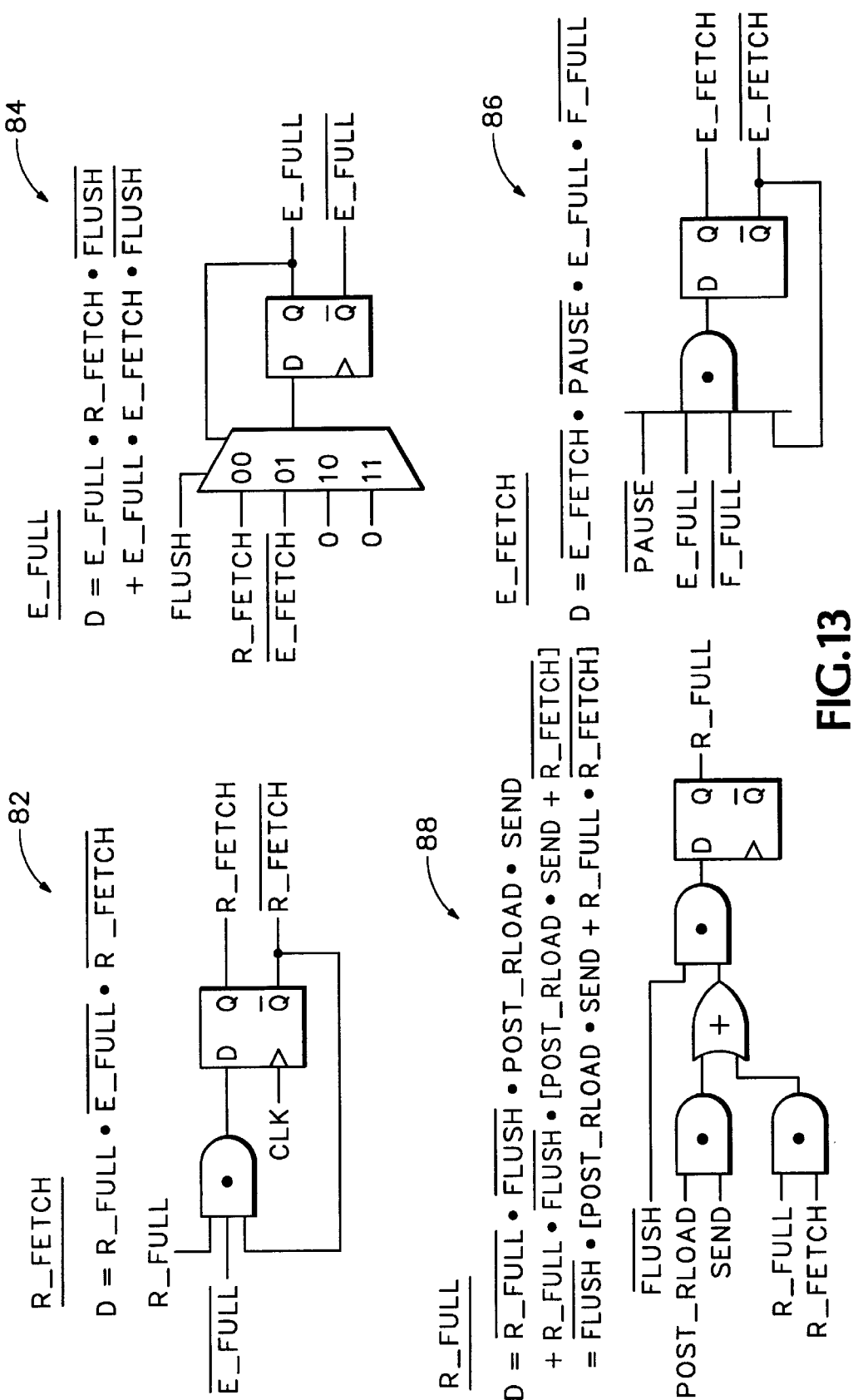
FIGS. 13 and 14 are hardware implementations of the state diagrams shown in FIGS. 10–12.
Figure 14:
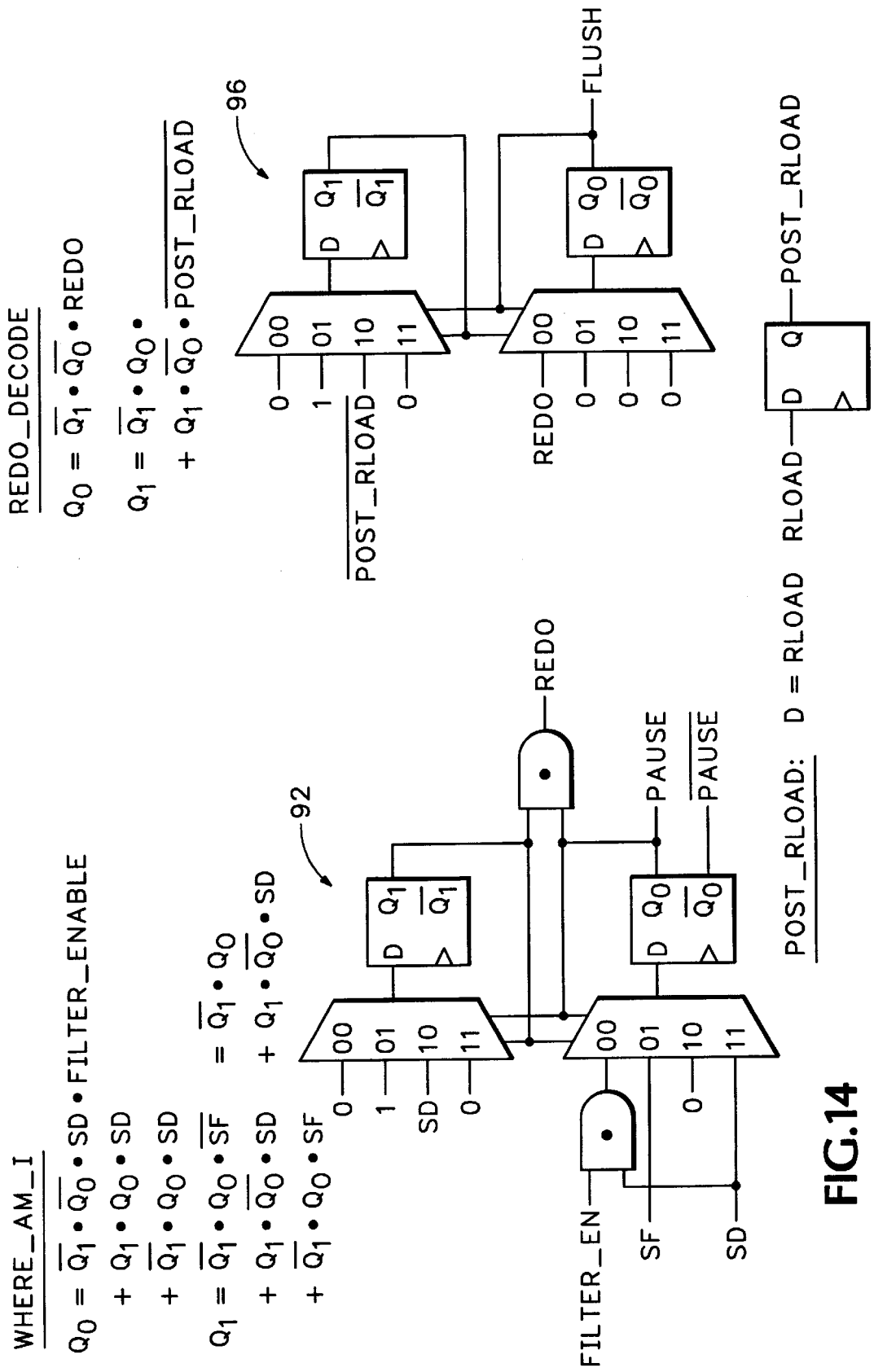

FIGS. 13 and 14 are circuit implementations for the state machines R_FETCH 82, R_FULL 88, E_FULL 84, E_FETCH 86, WHERE_AM_I 92 and REDO_DECODE 96. Alternative implementations are possible such as with software in a programmable processing device.

Figure 15:
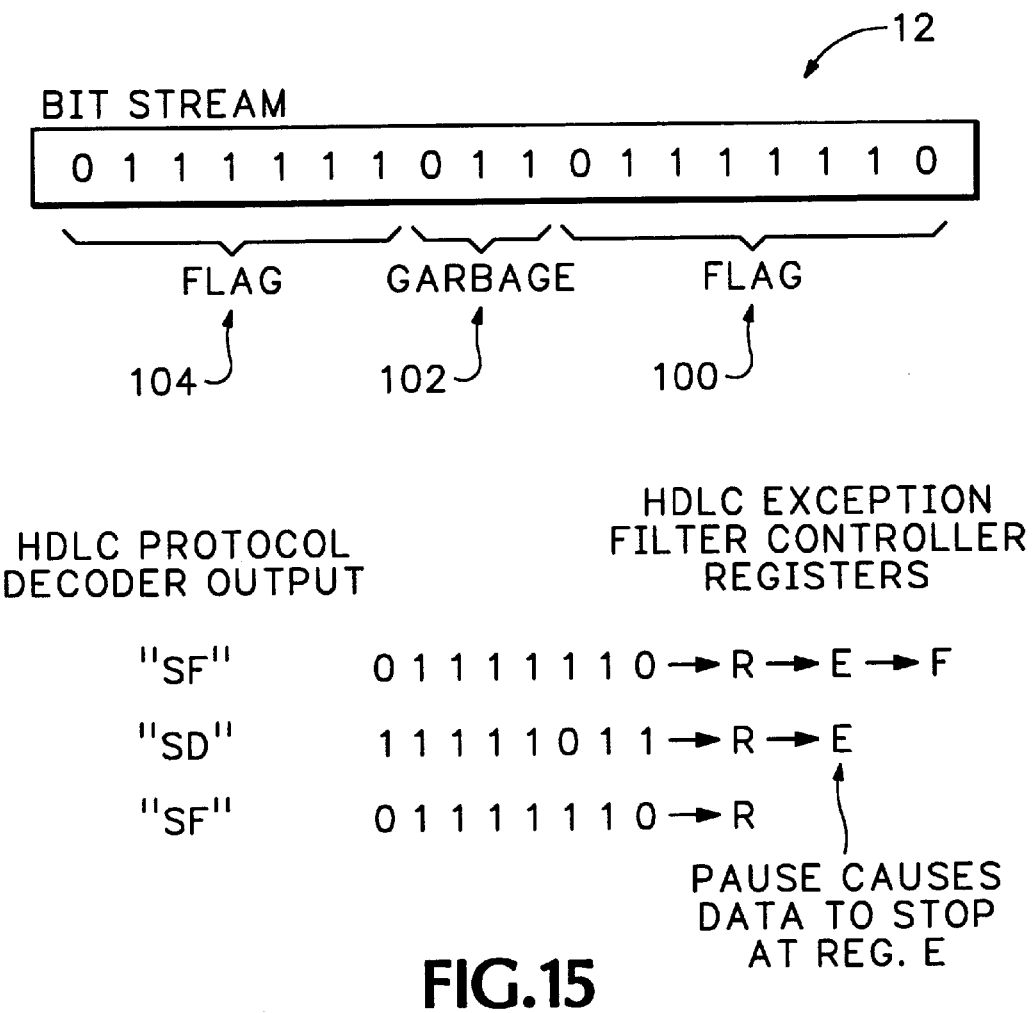
FIG. 15 is a bit stream showing how bits are flushed from the protocol exception filter.

FIG. 15 is a schematic diagram showing how the bit stream 12 is filtered for HDLC protocol exceptions. A first flag 100 coming into the protocol exception filter 34 comprises the end of a previous HDLC packet. The HDLC protocol decoder 36 identifies the first 8 bits as a flag by sending the SF signal to the protocol exception filter 34. The flag bits 100 propagate from the SP converter 52 (FIG. 7), through the R register 54 and the E register 56 and into the F register 58. The protocol exception filter 34 takes the next 8 bits 11111011 which includes two garbage bits 102 and the next six bits from a flag 104.

The send data signal SD from the HDLC decoder 36 causes the controller 50 to assert the PAUSE signal. The 8 bits containing the garbage bits 102 and a portion of the flag bits 104 stop in the E register 56 due to the PAUSE signal. The HDLC decoder 36 asserts the flag signal SF again when the two remaining bits of flag 104 pass into the SP converter 52. Because the flag 104 was not within an 8 bit boundary, a resynchronization occurs.

The state machine 92 moves to state MIDDLE when the SD signal is asserted. The next SF signal causes the state machine to move to state REDO. The REDO state causes the FLUSH signal to be asserted, resetting the R_FULL state machine 88 and the E_FULL state machine 84. In turn, the data in R register 54 and E register 56 is flushed while the bits 100 in register F from the previous HDLC packet are unaffected.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A circuit for filtering protocol exceptions from a bit stream, comprising:

a packet decode circuit for identifying bit sequences for frames in the bit stream;

a data pipeline that buffers the bit stream received from the packet decode circuit; and a protocol filter controller that detects exceptions to indicators of an invalid frame condition, a valid idle condition and a valid flag condition in a packet protocol according to the bit sequences and a variable number of bits in the bit sequences for the indicators identified in the packet decode circuit, the protocol filter flushing the exceptions from the data pipeline.

2. A circuit according to claim 1 including a control line coupled to the controller for selectively enabling and disabling the protocol filter controller, while invalid frame conditions continue to be aborted by a packet protocol decoder.

3. A circuit according to claim 1 wherein the bit stream is transmitted in an HDLC packet format and the packet decode circuit identifies HDLC flags and HDLC idle bits for the protocol filter controller and the protocol filter controller identifies exceptions having fewer bits than used to identify an invalid HDLC frame, valid HDLC flag or valid HDLC idle condition.

4. A circuit according to claim 1 wherein the data pipeline includes multiple parallel bit registers coupled together in series for selectively propagating groups of bits from the bit stream through the multiple registers at the same time according to the protocol filter controller.

5. A circuit for filtering protocol exceptions from a bit stream, comprising:
  a packet decode circuit for identifying bit sequences in the bit stream;
  a data pipeline that buffers the bit stream received from the packet decode circuit, the data pipeline including multiple parallel bit registers coupled together in series for selectively propagating groups of bits from the bit stream through the multiple registers at the same time according to the protocol filter controller; and
  a protocol filter controller that detects exceptions to an invalid frame condition, a valid idle condition and a valid flag condition in a packet protocol according to the bit sequences identified in the packet decode circuit and flushes the exceptions from the data pipeline, the protocol filter controller including the following:
    handshaking circuitry for controlling the propagation of the bit stream through the multiple registers; and
    flushing control circuitry that controls the handshaking circuitry according to the bit sequences identified in the packet decode circuit.

6. A circuit according to claim 5 wherein the handshaking circuitry includes a register fetch circuit and a register full circuit for each register in the data pipeline, the register fetch circuit directing a data fetch from a preceding register in the data pipeline and the register full circuit identifying when the register is storing data.

7. A circuit according to claim 5 wherein the flushing control circuitry includes the following:
  a packet locator circuit for monitoring locations of packet flags and packet data in the bit stream; and
  a REDO circuit that flushes bits from the bit stream according to the packet locations monitored in the packet locator circuit.

8. A circuit according to claim 7 wherein the flushing control circuitry includes a pause circuit for pausing the propagation of the bit stream through the data pipeline according to the packet locations monitored in the packet locator circuit.

9. A method for filtering packet protocol exceptions from a bit stream, comprising:
  detecting packets in the bit stream;
  identifying variable length bit sequences in the packets;
  identifying the bit sequences that constitute exceptions to valid packet protocol indicators, the indicator exceptions identified according to a sequence of bits in the bit stream and a number of bits in the sequence too few to qualify as one of the valid packet protocol indicators; and
  flushing the exceptions from the bit stream thereby preventing the exceptions from causing packet protocol errors.

10. A method according to claim 9 wherein the valid packet protocol categories comprise flag conditions, idle conditions, data conditions and frame abort conditions and the packet protocol exceptions comprises a series of bits too few to qualify for any one of the valid packet protocol categories.

11. A method according to claim 9 including selectively enabling and disabling flushing of the protocol exceptions from the bit stream.

12. A method for filtering packet protocol exceptions from a bit stream, comprising:
  detecting packets in the bit stream;
  identifying bit sequences in the packets;
  identifying the bit sequences that constitute exceptions to valid packet protocol categories; and
  flushing the exceptions from the bit stream thereby preventing the exceptions from causing packet protocol errors, the valid packet protocol categories comprising flag conditions, idle conditions, data conditions and frame abort conditions and the packet protocol exceptions comprising a series of bits too few to qualify for any one of the valid packet protocol categories,
  the packet protocol comprising a High Level Data Link Control (HDLC) protocol and the number of bits in the packet protocol exceptions is less than a number of bits necessary to identify an HDLC frame abort, HDLC flag or HDLC idle protocol category.

13. A method for filtering packet protocol exceptions from a bit stream, comprising:
  detecting packets in the bit stream;
  identifying bit sequences in the packets;
  identifying the bit sequences that constitute exceptions to valid packet protocol categories; and
  flushing the exceptions from the bit stream thereby preventing the exceptions from causing packet protocol errors, wherein flushing the exceptions comprises the following steps:
    identifying the packet as either at in a beginning, middle or end position;
    pausing propagation of the bit stream while in the identified middle position of the packet; and
    flushing bits in the bit stream when a packet flag is detected in the middle position of the packet.

14. A method according to claim 13 wherein flushing bits comprises controlling handshaking between a series of registers that cause identified protocol exception bits to be written over in a selected one of the registers while propagating the remaining bits through the remaining registers.

15. A packet protocol exception filter for a HDLC packet protocol, comprising:
  multiple registers coupled together in series forming a data pipeline for receiving and propagating a bit stream formatted in the HDLC packet protocol; and
  a controller coupled to each of the multiple registers, the controller including a detection circuit that identifies exceptions to variable multiple bit identifiers of valid HDLC frame abort, idle, flag and data categories in the bit stream according to the sequence of bits in the multiple bit sequence identifiers and the number of bits in the multiple bit sequence identifiers and a register control circuit controlling the propagation of the bit stream through the data pipeline and filtering the exceptions from the data pipeline according to the exceptions identified in the detection circuit preventing the exceptions from generating errors in an HDLC decoder.

16. An exception filter according to claim 15 wherein the exceptions each comprise a number of bits between adjacent flags that is less than a number of bits necessary to identify the adjacent flags.

17. An exception filter according to claim 15 wherein the exceptions occur between a closing flag indicating the end of a first frame and a opening flag indicating the start of a second frame.

18. A packet protocol exception filter for a HDLC packet protocol, comprising:

multiple registers coupled together in series forming a data pipeline for receiving and propagating a bit stream formatted in the HDLC packet protocol, wherein each one of the registers has an associated first and second state machine, the first state machine controlling a chip enable for the associated register and the second state machine controlling a full indication status for the associated register; and a controller coupled to each of the multiple registers, the controller including a detection circuit that identifies exceptions to valid HDLC frame abort, idle, flag and data categories in the bit stream and a register control circuit controlling the propagation of the bit stream through the data pipeline and filtering the exceptions from the data pipeline according to the exceptions identified in the detection circuit preventing the exceptions from generating errors in an HDLC decoder.

19. An exception filter according to claim 18 wherein the detection circuit comprises a first HDLC packet identification circuit for detecting the positions of HDLC packets and a second flushing circuit for flushing exceptions from the data pipeline according to the detected position of the HDLC packet.

* * * * *

UNITED STATES PATENT AND TRADEMARK OFFICE
CERTIFICATE OF CORRECTION

PATENT NO. : 6,128,313 Page 1 of 1
DATED : October 3, 2000
INVENTOR(S) : Chapman et al.

It is certified that error appears in the above-identified patent and that said Letters Patent is hereby corrected as shown below:

Column 1,
Line 22, "flags idle" should read -- flags, idle --.

Column 4,
Line 65, "(FIG. 7.)" should read -- (FIG. 7). --.

Column 6,
Line 13, "it not" should read -- it has not --.

Signed and Sealed this

Sixth Day of August, 2002

Attest:

JAMES E. ROGAN
Attesting Officer  Director of the United States Patent and Trademark Office